(12) United States Patent
Ohkura et al.

(10) Patent No.: US 6,295,278 B1
(45) Date of Patent: Sep. 25, 2001

(54) ATM DEVICE

(75) Inventors: Ritsuko Ohkura; Hideaki Mochizuki, both of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/044,656

(22) Filed: Mar. 19, 1998

(30) Foreign Application Priority Data

Oct. 17, 1997 (JP) .................................................. 9-285749

(51) Int. Cl.$^7$ .................................................. H04L 12/28
(52) U.S. Cl. ......................... 370/252; 370/252; 370/395
(58) Field of Search .................................. 370/252, 253, 370/395

(56) References Cited

U.S. PATENT DOCUMENTS 5,661,722 * 8/1997 Miyagi ................................... 370/252
5,878,063 * 3/1999 Kawasaki et al. ...................... 370/395
5,974,045 * 10/1999 Ohkura et al. ......................... 370/395
6,108,782 * 8/2000 Fletcher et al. ........................ 370/252

FOREIGN PATENT DOCUMENTS 5-292118    11/1993   (JP) .
6-334677    12/1994   (JP) .

* cited by examiner

Primary Examiner—Salvatore Cangialosi
(74) Attorney, Agent, or Firm—Helafott & Karas, PC

(57) ABSTRACT

An ATM device includes an extractor which extracts a cell related to a performance monitor process for an ATM layer, a processing unit executing the performance monitor process, a memory which stores information concerning the performance monitor process, and a decision making unit which compares the information stored in the memory with cell information of the cell extracted by the extractor and which makes a decision as to whether the cell extracted by the extractor should be supplied to the process unit.

15 Claims, 15 Drawing Sheets

| GFC | VPI | VCI | PTI | CLP | HEC | OAM Type | Fnc Type | PM SUBJECT SECTION |
|---|---|---|---|---|---|---|---|---|
| 0000 | VPI | 3 | 000 | NEGLECT | | 1000 | 0000 | VP Segment |
| | | 4 | | | | | | VP E-to-E |
| | | VPI | 100 | | | | | VC Segment |
| | | VPI | 101 | | | | | VC E-to-E |

FIG. 15

| ITEM | MESSAGE | VALUE | APPLICATION |
|---|---|---|---|
| 1 | Activation | 000001 | Activate USED WHEN ACTIVATE REQUEST |
| 2 | Activation Confirmed | 000010 | Activate USED WHEN ACCEPT ACTIVE REQUEST |
| 3 | Activation Request Denied | 000011 | Activate USED WHEN REJECT ACTIVE REQUEST |
| 4 | Dactivation | 000101 | Dactivate USED WHEN DEACTIVE REQUEST |
| 5 | Dactivation Confirmed | 000110 | Dactivate USED WHEN ACCEPT DEACTIVE REQUEST |
| 6 | Dactivation Request Denied | 000111 | Dactivate USED WHEN REJECT DEACTIVE REQUEST |

FIG.16

| CODE | | |
|---|---|---|
| 0 0 | not applicable | DEFAULT(INVALID CELL) |
| 0 1 | B to A | |
| 1 0 | A to B | |
| 1 1 | for Two-Way | |

FIG.17

| CODE | Block Size | | |
|---|---|---|---|
| 0 0 0 1 | 1 0 2 4 | | |
| 0 0 1 0 | 5 1 2 | | |
| 0 1 0 0 | 2 5 6 | | |
| 1 0 0 0 | 1 2 8 | | |

ATM DEVICE

BACKGROUND OF THE INVENTION

1. Field of the Invention

The present invention generally relates to ATM (Asynchronous Transfer Mode) devices, and more particularly to an ATM device which serves as an ATM NE (Network Element) provided in a subscriber line which connects connecting an ATM switch and a subscriber home. More particularly, the present invention is concerned with an ATM device which performs a PM (Performance Monitor) process, which is an OAM (Operation And Maintenance) function in the ATM layer.

Recently, a communication device that utilizes the ATM technique has been required to efficiently perform the OAM process in the ATM layer necessary for the operation and maintenance of an ATM network in order to meet various services.

In order to realize the efficiency of the OAM process in the ATM layer, it is required to provide an ATM device capable of efficiently performing the performance monitor process in the ATM layer and consuming a reduced amount of power.

2. Description of the Related Art

A conventional ATM device employs a structure as shown in FIG. 1 in order to perform the performance monitor process which is the OAM function in the ATM layer.

In the performance monitor process that is the OAM function in the ATM layer, an activation cell is defined that includes an activate cell (hereinafter also referred to Act cell), an activate confirmed cell (hereinafter also referred to as ActConf cell), and activate request denied cell (hereinafter also referred to ActDenied cell). The Act cell requests to start to execute the performance monitor process for performance test. The ActConf cell permits starting to execute the performance monitor process. The ActDenied cell denies starting to execute the performance monitor process. Also, a deactivation cell is defined which includes a deactivate cell (hereinafter also referred to as Deact cell), a deactivate confirmed cell (hereinafter also referred to as DeactConf cell), and a deactivate request denied cell (hereinafter also referred to as DeactDenied cell). The deactivate cell terminates the performance monitor process that is in progress. The deactivate confirmed cell permits terminating the performance test which is in progress. The deactivate request denied cell rejects termination of the performance test which is in progress.

The ATM device shown in FIG. 1 includes an ACT/DACT cell extractor 301, a cell information notification register 302, a CPU 303, a cell output specification register 304, an ACT/DACT cell inserter 305. The ACT/DACT cell extractor 301 extracts the activation cell and deactivation cell on the ATM network. The cell information notification register 302 temporarily stores the information of the cells extracted by the cell extractor 301 in order to notify the CPU 303 of the information. The CPU 303 controls the start and termination of the performance monitor process on the basis of the information from the register 302. The cell output specification register 304 stores the activation cell and the deactivation cell to be output under the control of the CPU 303. The ACT/DACT cell inserter 305 inserts, into the ATM network, the activation cell and the deactivation cell specified in the cell output specification register 304.

The CPU 303 is notified, via the register 302, of the cell information concerning the activation cell and the deactivation cell extracted by the ACT/DACT cell extractor 301, namely, cell information concerning the activate cell, activate confirmed cell, activate request denied cell, deactivate cell, deactivate confirmed cell and deactivate request denied cell.

The CPU 303 analyzes the received cell information, and controls the start and termination of the performance monitor process and a response to a request issued from a remote terminal.

More particularly, if the ACT/DACT cell extractor 301 extracts the activate cell, the CPU 303 determines whether the performance monitor process should be started in a channel specified by the information provided in the activate cell.

When it is determined that the performance monitor process should be started, the CPU 303 instructs the cell output specification register 304 to output the activate confirmed cell. The ACT/DACT cell inserter 305 sends the specified activate confirmed cell to the ATM network. When it is determined that execution of the performance monitor process should be rejected, the CPU 303 instructs the cell output specification register 304 to output the activate request denied cell. The ACT/DACT cell inserter 305 sends the specified activate request denied cell to the ATM network.

If the ACT/DACT cell extractor 301 extracts the deactivate cell, the CPU 303 determines whether the performance monitor process which is now in progress should be terminated in a channel specified by the information in the deactivate cell.

When the performance monitor process is allowed to be terminated, the CPU 303 instructs the cell output specification register 304 to output the deactivate confirmed cell. The ACT/DACT cell inserter 305 sends the specified deactivate confirmed cell to the ATM network. When termination of the performance monitor process is rejected, the CPU 303 instructs the cell output specification register 304 to output the deactivate request denied cell. The ACT/DACT cell inserter 305 sends the specified deactivate request denied cell to the ATM network.

When the own device sends the activate cell to the ATM network, the CPU 303 determines whether the ACT/DACT cell extractor 301 extracts the activate confirmed cell or activate request denied cell. When the activate request denied cell is extracted, the CPU 303 starts the performance monitor process from the own device. When the activate request denied cell is extracted, the CPU 303 cannot start the performance monitor process from the own device.

When the own device sends the deactivate cell to the ATM network, the CPU 303 determines whether the ACT/DACT cell extractor 301 extracts the deactivate confirmed cell or the deactivate request denied cell. When the deactivate confirmed cell is extracted, the CPU 303 terminals the performance monitor process which is in progress. When the deactivate request denied cell is extracted, the CPU 303 cannot terminate the performance monitor process that is in progress.

As shown in FIG. 2, the cell information notification register 302 of the conventional ATM device includes a memory 311 from which an interrupt request is applied to the CPU 303 when the memory 311 receives the cell information concerning the activate cell, activate confirmed cell, activate request denied cell, deactivate cell, deactivate confirmed cell and deactivate request denied cell.

However, in the conventional ATM device, the CPU is informed of all the activation cell and the deactivation cell in the performance monitor process of the ATM layer. Hence, the CPU analyzes all the activation cell and the deactivation cell, and determines, for each VP/VC channel, whether the performance monitor process should be started or terminated. Further, the CPU controls a response to each of all requests from other devices.

In practice, there is no need to process all the activation and deactivation cells extracted by the CPU, as will be described in detail later.

SUMMARY OF THE INVENTION

It is a general object of the present invention to provide an ATM device in which the above disadvantages are eliminated.

A more specific object of the present invention is to provide an ATM device capable of processing activation and deactivation cells which are really required to be processed by a CPU or the like.

The above objects of the present invention are achieved by an ATM device comprising: an extractor which extracts a cell related to a performance monitor process for an ATM layer; a processing unit executing the performance monitor process; a memory which stores information concerning the performance monitor process; and a decision making unit which compares the information stored in the memory with cell information of the cell extracted by the extractor and which makes a decision as to whether the cell extracted by the extractor should be supplied to the process unit.

The ATM device may be configured so that:
the memory has memory areas equal in number of channels that can be processed by the processing unit;
and the memory areas respectively store cells extracted by the extractor.

The ATM device may be configured so that:
the memory has memory areas equal in number of channels that can be processed by the processing unit;
the memory areas respectively store cells extracted by the extractor;
a memory state detector which determines whether there is any idle memory area in the memory;
and the decision making unit determines that the cell extracted by the extractor should not be supplied to the processing unit when the cell extracted by the extractor requests initiation of the performance monitor process and the memory state detector determines that there is no idle memory area in the memory.

The ATM device may be configured so that it further comprise a cell sending unit which sends a denied cell back to a network to which the ATM device is connected when it is determined that the cell extracted by the extractor should not be sent to the processing unit.

The ATM device may be configured so that:
the memory stores information indicating channels which are now subjected to the performance monitor process; and
the extracted by the extractor is not supplied to the processing unit when the decision making unit determines that cell information of the extracted cell coincides with the information stored in the memory.

The ATM device may be configured so that: the memory stores information indicating a channel which is now subjected to the performance monitor process in response to a request issued by the ATM device and information indicating that a request to terminate the performance monitor process which is initiated in response to a request issued by the ATM device is issued by another ATM device should be neglected; and the cell extracted by the extractor is not supplied to the processing unit when the decision making unit determines that cell information of the extracted cell coincides with the information stored in the memory.

The ATM device may be configured so that:
the memory stores information indicating a channel which is now subjected to the performance monitor process in response to a request issued by the ATM device and information indicating a channel which is now on request for the performance monitor process;
and the cell extracted by the extractor is not supplied to the processing unit when the decision making unit determines that cell information of the extracted cell coincides with the information stored in the memory.

The ATM device may be configured so that:
the memory stores information indicating a channel which is now on request for initiation of the performance monitor process issued by the ATM device;
and the cell extracted by the extractor is not supplied to the processing unit when the cell requests a confirmation of initiation of the performance monitor process or denies the request for initiation of the performance monitor process and the decision making unit determines that cell information of the extracted cell does not coincide with the information stored in the memory.

The ATM device may be configured so that:
the memory stores information indicating a channel which is now on request for termination of the performance monitor process issued by the ATM device;
and the cell extracted by the extractor is not supplied to the processing unit when the cell requests a confirmation of termination of the performance monitor process or denies the request for termination of the performance monitor process and the decision making unit determines that cell information of the extracted cell does not coincide with the information stored in the memory.

The ATM device may be configured so that:
the memory stores information indicating a block size that can be processed by the processing unit;
and the cell extracted by the extractor is not supplied to the processing unit when the decision making unit determines that the cell has a block size which is inconsistent with the block size stored in the memory.

The ATM device may be configured that it may further comprise another memory which temporarily stores the cell extracted by the extractor and which is determined that the cell should be supplied to the processing unit, the processing unit periodically accessing said another memory and determines whether there is any cell to be processed.

The ATM device may be configured so that a part of an address of said another memory is common to an address of said memory which stores the information concerning the performance monitor process.

BRIEF DESCRIPTION OF THE DRAWINGS

Other objects, features and advantages of the present invention will become more apparent from the following detailed description when read in conjunction with the accompanying drawings, in which:

FIG. 15 is a diagram showing a message ID;

FIG. 16 is a diagram showing the detail of a direction of action; and

FIG. 17 is a diagram showing a block size of cell.

DESCRIPTION OF THE PREFERRED EMBODIMENTS

Figure 3:
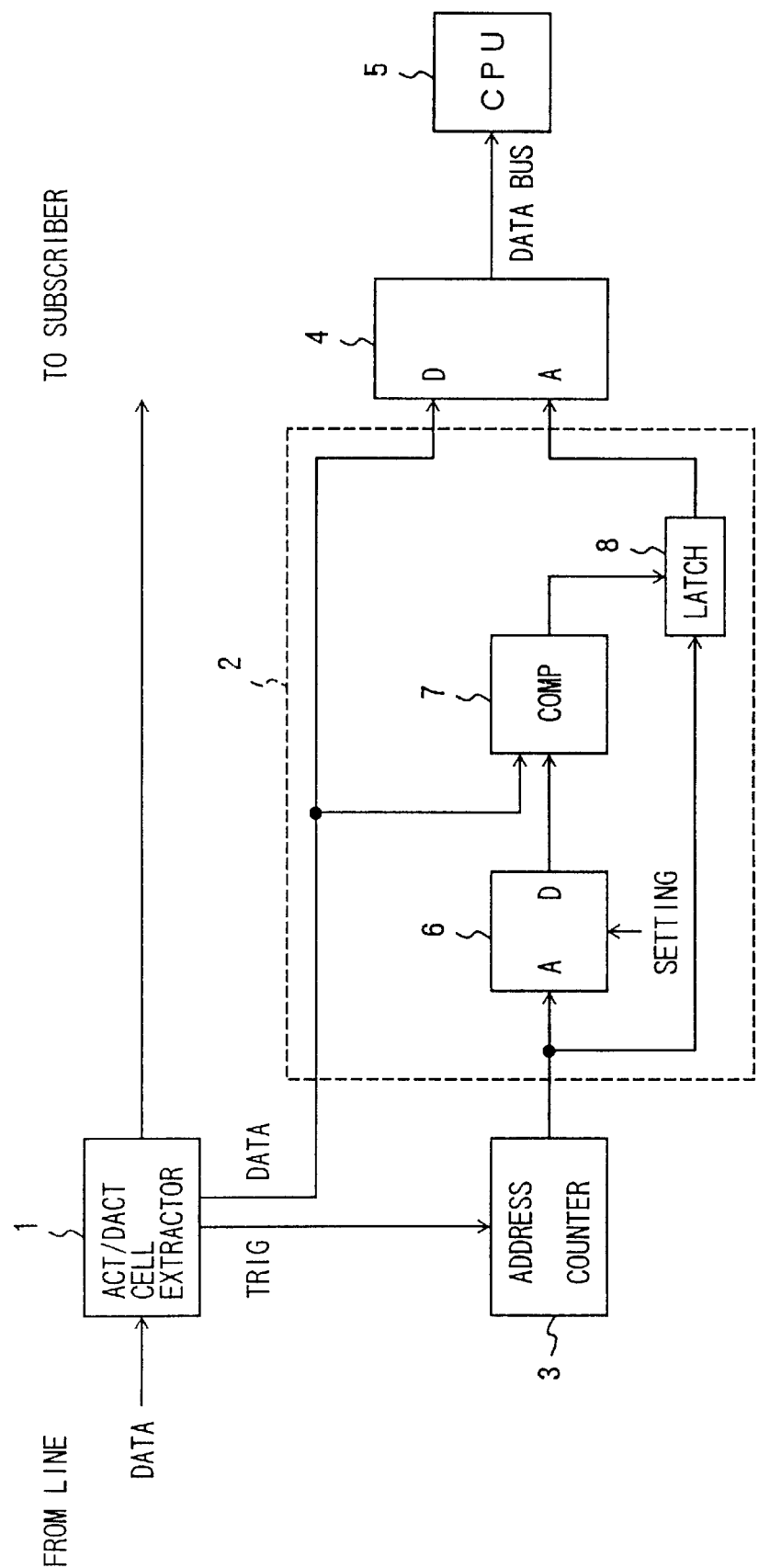
FIG. 3 is a block diagram of the principle of an ATM device according to the present invention.

FIG. 3 is a block diagram of the principle of the present invention.

An ATM device shown in FIG. 3 includes an ACT/DACT cell extractor 1, a performance monitor internal state management unit 2, an address counter 3, an ACT/DACT cell information notification register 4, and a CPU 5. The structure shown in FIG. 3 controls the start and termination of the performance monitor process which is the OAM function in the ATM layer, and a response to a request issued from another device.

The ACT/DACT cell extractor 1 extracts the activation cell and the deactivation cell. The performance monitor internal state management unit 2 includes a performance monitor internal state information memory 6, a comparator 7, and a latch circuit 8. The performance monitor internal state management unit 2 identifies only valid cells from among the activation cells and deactivation cells extracted by the extractor 1 on the basis of given information stored in the performance monitor internal state information memory 6. In other words, invalid cells which are not identified have defective factors such as erroneous inserting, loss of cell and erroneous ordering. Hence, only valid cells are applied to the CPU 5 via the register 4.

The comparator 7 compares the extracted activation or deactivation cell with the information stored in the memory 6, and determines whether the extracted cell is a valid cell to be supplied to the CPU 5. When it is determined that the extracted cell is a valid cell, the latch circuit 8 latches the address of the memory 6 obtained at that time. The contents of the memory 6 can periodically be rewritten under control of the CPU 5 or a microcomputer (not shown in FIG. 3).

The address counter 3 generates an address applied to the memory 6 when the activation or deactivation cell is extracted by the extractor 1. The ACT/DACT cell information notification register 4 temporarily stores, at the address latched in the latch circuit 8, the activation or deactivation cell which is determined as being a valid cell. The latched cell is then read from the register 4 and is supplied to the CPU 5.

The CPU 5 controls the start and termination of the performance monitor process and a response to a request from another device on the basis of the valid activation or deactivation cell supplied via the register 4.

Figures 13, 14:
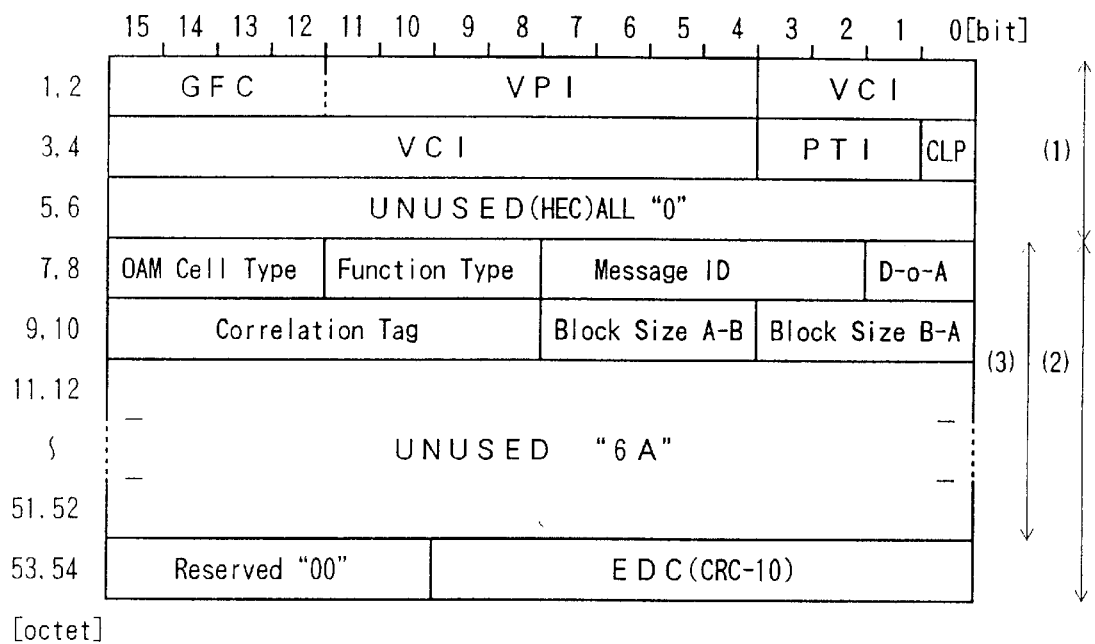
FIG. 13 is a diagram showing a format of an activation cell and a deactivation cell.
FIG. 14 is a diagram showing a header of the cell.

The activation and deactivation cells have a format as shown in FIG. 13. Each of the activation and deactivation cells consists of 54 bytes, and includes a header (1) and a payload (2). The payload (2) includes specific information field (3).

As shown in FIG. 14, the header (1) includes GFC (Generic Flow Control), VPI (Virtual Path Identifier), VCI (Virtual Channel Identifier), PTI (Payload Type Identifier), CLP (Cell Loss Priority), HEC (Header Error Control), and an OAM type and Fnc type. When the OAM type and Fnc Type are respectively 1000 and 0000, the extracted cell is the activation cell or the deactivation cell.

The payload (2) includes, as information indicative of the activation and deactivation cells, a message ID, a direction of action (D-o-A), a correction tag, and information concerning the block size. The above information is defined every performance monitor subject section (VP segment, VP End to End, VC Segment, VC End to End). The message ID indicates to which one of the activate cell, activate confirmed cell, activate denied cell, deactivate cell, deactivate confirmed cell and deactivate denied cell the received cell corresponds (see FIG. 15). The direction-of-action information indicates the direction of the performance monitor process (see FIG. 16). The correction tag information indicates the number of times that the performance monitor process is retried. The block size indicates the number of user cells to be sent between performance monitor cells when the performance monitor process is executed (see FIG. 17).

FIG. 15 shows the detail of the message ID. As shown in FIG. 15, the message ID is set to 000001 when the received cell is the activate cell. The message ID is set to 000010 when the received cell is the activate confirmed cell. The message ID is set to 000011 when the received cell is the activate request denied cell. The message ID is set to 000101 when the received cell is the deactivate cell. The message ID is set to 000110 when the received cell is the deactivate confirmed cell. The message ID is set to 000111 when the received cell is the deactivate request denied cell.

As shown in FIG. 16, the direction-of-action information is set to 01 when the performance monitor process is oriented from another ATM device to the own ATM device (indicated as B to A in FIG. 16). The direction-of-action information is set to 10 when the performance monitor process is oriented from the own ATM device to another ATM device. The direction-of action information is set to 11 when the performance monitor process can be executed in two directions.

As shown in FIG. 17, the block size is set to 0001 when the number of user cells sent between the performance monitor cells when the performance monitor process is executed is equal to 1024. The block size is set to 0010 when the number of user cells sent between the performance monitor cells when the performance monitor process is executed is equal to 512. The block size is set to 0100 when the number of user cells sent between the performance monitor cells when the performance monitor process is executed is equal to 256. The block size is set to 1000 when the number of user cells sent between the performance monitor cells when the performance monitor process is executed is equal to 128.

When the activation cell or the deactivation cell is extracted, the ACT/DACT cell extractor 1 generates a trigger signal Trig (FIG. 3) to the address counter 3.

In response to the trigger signal, the address counter 3 generates the address of the performance monitor internal state information memory 6. Then, the given information to be compared with the extracted activation or deactivation cell is read from the performance monitor internal state information memory 6. The given information includes, for example, the VPI and VCI of the channel subjected to the performance monitor process, the performance monitor subject section, and code information indicative of the state of the performance monitor process. The code information indicates the following: non-entry cell; the activate cell is being requested; the performance monitor process is being processed; the deactivate cell is being requested; the activate cell time out; and the deactivate cell time out.

As described above, the ATM device shown in FIG. 3 operates so that the CPU 5 analyzes only the valid activation and deactivation cells. Then, the CPU 5 starts and terminates the performance monitor process for each VP/VC channel, and control a response to a request from another ATM device. Hence, the CPU 5 is not required to process a larger number of VP/VC channels than the number of channels exceeding the allowed number of channels which can definitely be processed by the CPU 5. The CPU 5 does not process the invalid cells having defective factors. Thus, the CPU 5 processes a reduced amount of data and has a reduced load. Hence, the CPU 5 operates efficiently.

A description will now be given of various embodiments of the present invention that are configured in accordance with the principle described with reference to FIG. 3.

Figure 4:
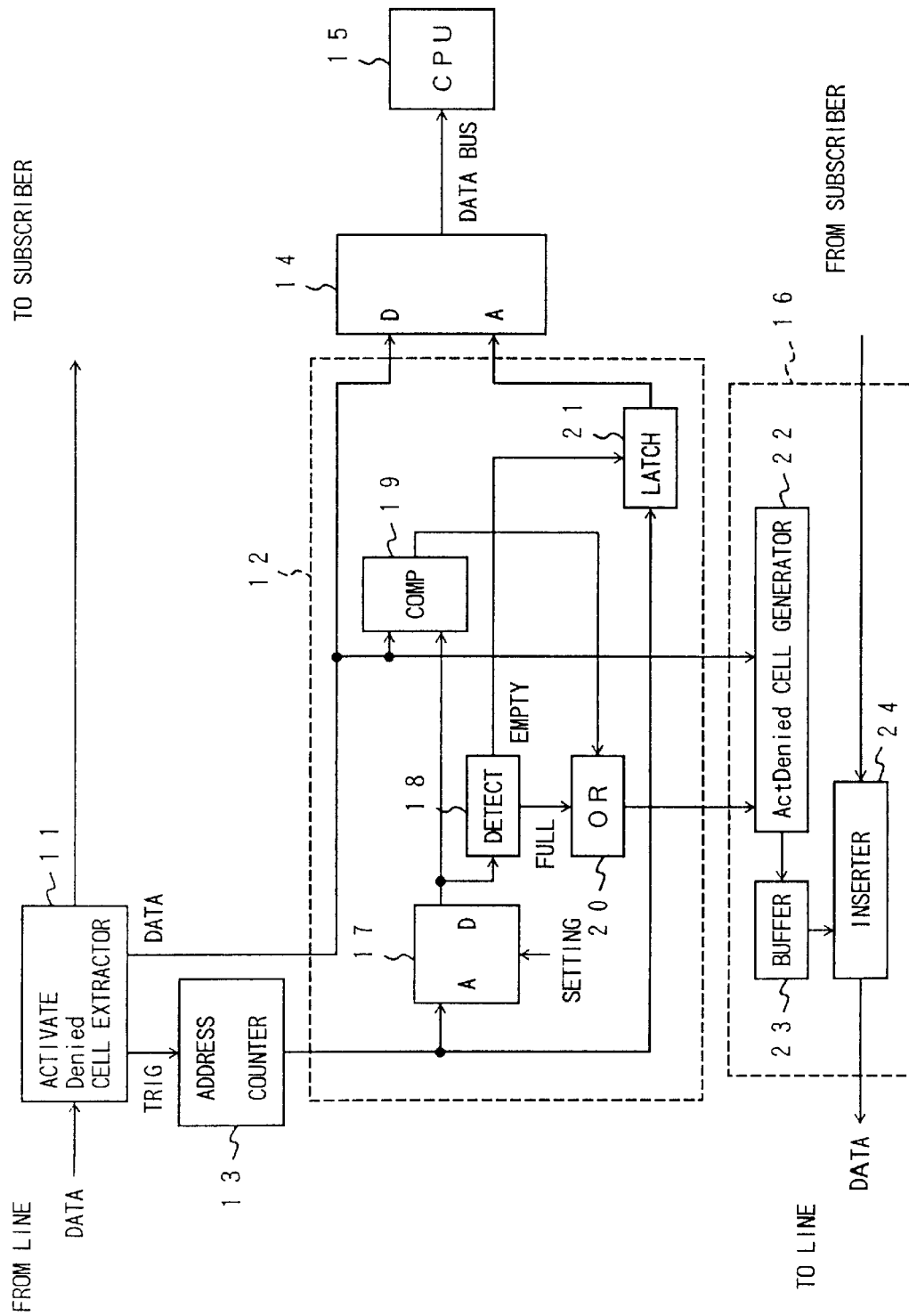
FIG. 4 is a block diagram of an ATM device according to a first embodiment of the present invention.

FIG. 4 is a block diagram of an ATM device according to a first embodiment of the present invention. The ATM device shown in FIG. 4 includes an activate cell extractor 11, a performance monitor internal state management unit 12, an address counter 13, an ACT/DACT cell information notification register 14, a CPU 15 and an activate request denied cell sending unit 16.

The activate cell extractor 11 extracts the activate cell on the ATM network. The performance monitor internal state management unit 12 includes a performance monitor internal state information memory 17, a memory state detector 18, a comparator 19, an OR gate 20 and a latch circuit 21. The comparator 19 compares the cell extracted by the extractor 11 with given information stored in the memory 17 in order to determine whether the extracted cell is valid. The memory state detector 18 monitors the state of the memory 17 and determines whether an idle area is available in the memory 17. The OR gate 20 notifies the activate request denied cell sending unit 16 that the memory 17 is full of data or the extracted cell is invalid. When the detector 18 determines that an idle area is available in the memory 17, the latch circuit 21 latches the address of the memory 17 applied thereto at that time. The address counter 13 receives the trigger signal Trig and then generates the address of the memory 17 when the activate cell extractor 11 extracts the activate cell.

The ACT/DACT cell information notification register 14 temporarily stores the activate cell which is determined as being valid with the address supplied from the address counter 13 via the latch circuit 21. The CPU 15 controls the performance monitor process in response to the activate cell read from the register 14.

The memory 17 has memory areas for storing the internal state information of the performance monitor equal in number to the channels for the performance monitor that can be processed by the CPU 5. If there is no idle area in the memory 17, the cell information of the extracted activate cell is not supplied to the CPU 5. Hence, it is possible to prevent the CPU 5 from executing the performance monitor process over a larger number of channels than the tolerable number of channels that can definitely be processed by the CPU 5. In this case, the ATM device is required to notify the ATM network that the activate cell is rejected. Hence, the memory state detector 18 sends the corresponding signal to the activate request denied cell sending unit 16 via the OR gate 20 in order to send the activate request denied cell to the network.

Even if it is determined that an idle area is available in the memory 17, if the cell information of the extracted activate cell coincides with any of the internal state information of the performance monitor process stored in the memory 17, it is recognized that the performance monitor process for the channel which is requested by the extracted activate cell is already initiated. In this case, in order to reject the extracted activate cell, the output signal of the comparator 19 is sent to the activate request denied cell sending unit 16 via the OR gate 20.

The activate request denied cell sending unit 16 sends the activate request denied cell to the ATM network in order to reject initiation of the performance monitor process when there is no idle area in the memory 17 or when the performance monitor process for the requested channel is already initiated. The activate request denied cell sending unit 16 includes an activate request denied cell generator 22, a buffer 23 and an activate request denied cell inserter 24. The activate request denied cell generator 22 generates the activate request denied cell using the extracted activate cell from the extractor 11. The activate request denied cell thus generated is temporarily stored in the buffer 23, and is inserted, via the activate request denied cell inserter 24, into data transferred over the line connected to the ATM network. More particularly, the activate request denied cell is inserted in an idle section equal to one cell in the cell stream transferred over the line.

Figure 1:
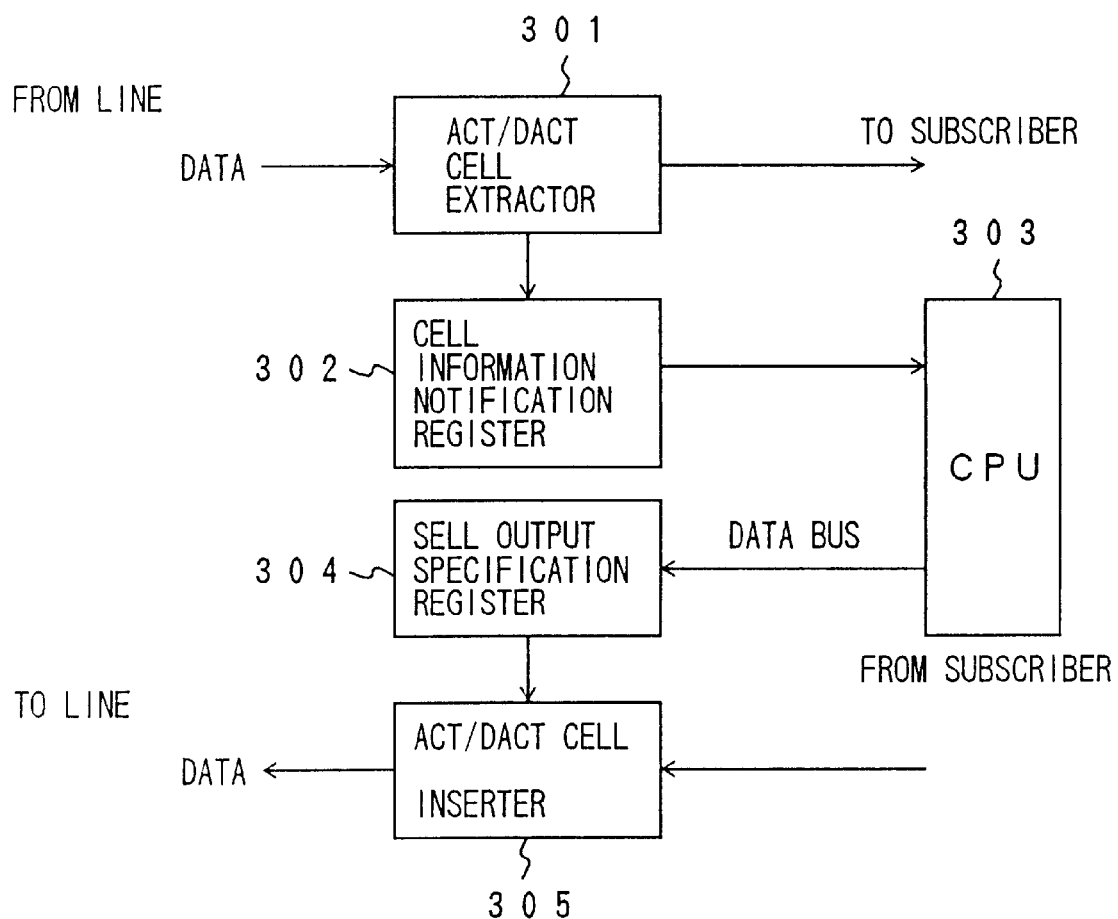
FIG. 1 is a block diagram of a conventional ATM device.
Figure 2:
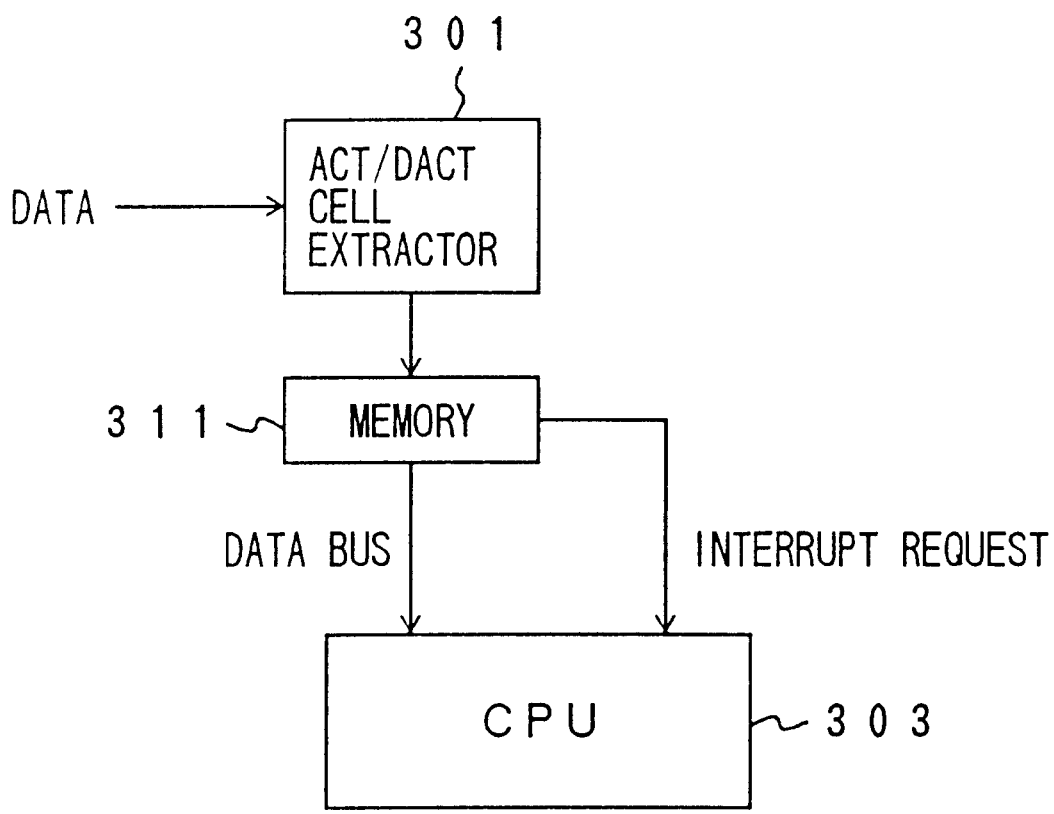
FIG. 2 is a block diagram of a structure which notifies a CPU of cell information of an extracted cell.

The ATM device shown in FIG. 4 is advantageous to the prior art shown in FIG. 1 as follows. In the prior art, the CPU 303 shown in FIG. 1 is informed of all the activate cells and analyzes the activate cells. Hence, the CPU 303 is required to process a larger number of VP/VC channels than the tolerable number of channels for the performance monitor process that can be processed by the CPU 303. Hence, the CPU 303 has a very heavy load. For example, the CPU 303 is informed of invalid cells which have defective factors. Also, the CPU 303 is required to receive and process an activate cell which requests the performance monitor process for a channel for which the performance monitor process is already initiated.

In contrast, the structure shown in FIG. 4 employs the memory 17 which has storage areas equal in number to channels which are subjected to the performance monitor process. Hence, the CPU 15 does not process a larger number of VP/VC channels than the number of channels provided in the memory 17. Further, the extracted activate cell related to the channel which is already subjected to the performance monitor process is rejected. Hence, the CPU 15 has a reduced load and thus operates efficiently.

Figure 5:
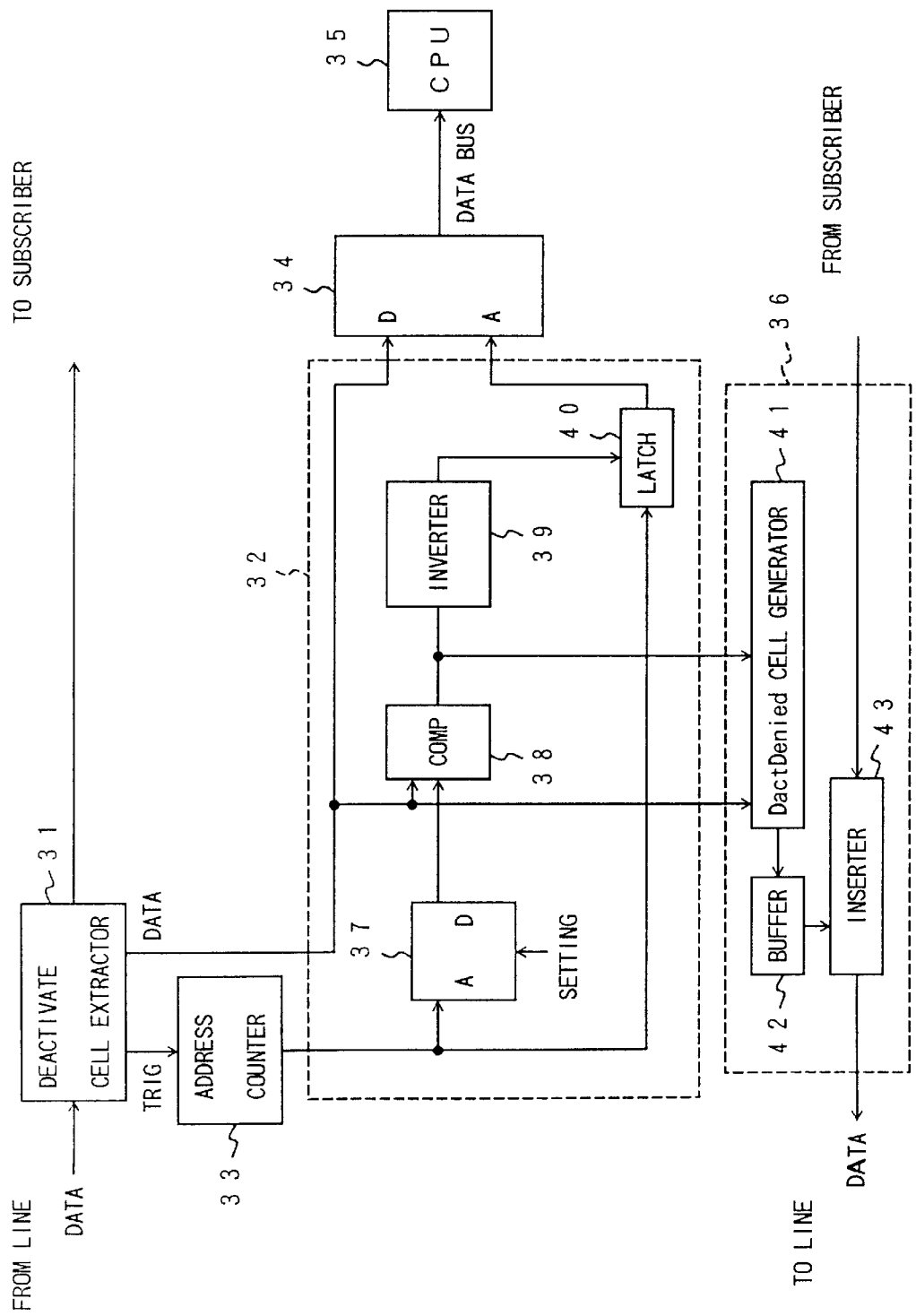
FIG. 5 is a block diagram of an ATM device according to a second embodiment of the present invention.

FIG. 5 is a block diagram of an ATM device according to a second embodiment of the present invention. The ATM device includes a deactivate cell extractor 31, a performance monitor internal state management unit 32, an address counter 33, an ACT/DACT cell information notification register 34, a CPU 35 and a deactivate request denied cell sending unit 36. The performance monitor internal state management unit 32 includes a performance monitor internal state information memory 37, a comparator 38, an inverter 39 and a latch circuit 40. The deactivate request denied cell sending unit 36 includes a deactivate request denied cell generator 41, a buffer 42 and a deactivate request denied cell inserter 43.

The deactivate cell extractor 31 extracts the deactivate cell from the signal received via the line, and supplies a trigger signal to the address counter 33, and supplies the management unit 32 with the cell information of the extracted deactivate cell. The address counter 33 generates the address of the memory 37 in response to the trigger signal from the extractor 31.

The internal state information of the performance monitor specified by the address supplied from the address counter 33 is read from the memory 37 and is supplied to the comparator 38. Then, the comparator 38 compares the internal state information with the cell information of the extracted deactivate cell. If the internal state information read from the memory 37 shows that the activate cell related to the channel of interest is issued by the own ATM device and the deactivate cell issued by another ATM device should be neglected, it is recognized that the extracted deactivate cell should not be accepted. Then, the comparator 38 notifies the deactivate request denied cell generator 41 that the extracted cell should be neglected when the cell information of the extracted cell coincides with the above read internal state information. Then, the generator 41 generates the deactivate request denied cell from the deactivate cell from the extractor 31. The above denied cell is send to the line via the buffer 42 and the inserter 43.

If the internal state information read from the memory 37 shows that the performance monitor process for the channel of interest is initiated by the activate cell issued by another ATM device or the deactivate cell issued by another ATM device should be accepted, the output signal of the comparator 38 is applied to the latch circuit 40 via the inverter 39 when the cell information of the extracted deactivate cell coincides with the read initial state information. Then, the cell information from the extractor 31 is written into the register 34 with the address generated by the address counter 33 obtained via the latch circuit 60.

In the prior art shown in FIG. 1, all the deactivate cells are sent to and processed by the CPU 35 irrespective of whether the performance monitor process is initiated by the activate cell issued by the own ATM device or another ATM device. In contrast, the structure shown in FIG. 5 rejects the deactivate cell if it requests to deactivate the performance monitor process initiated by the active cell issued by the own ATM device. Hence, the CPU 35 can operate efficiently with a reduced load.

Figure 6:
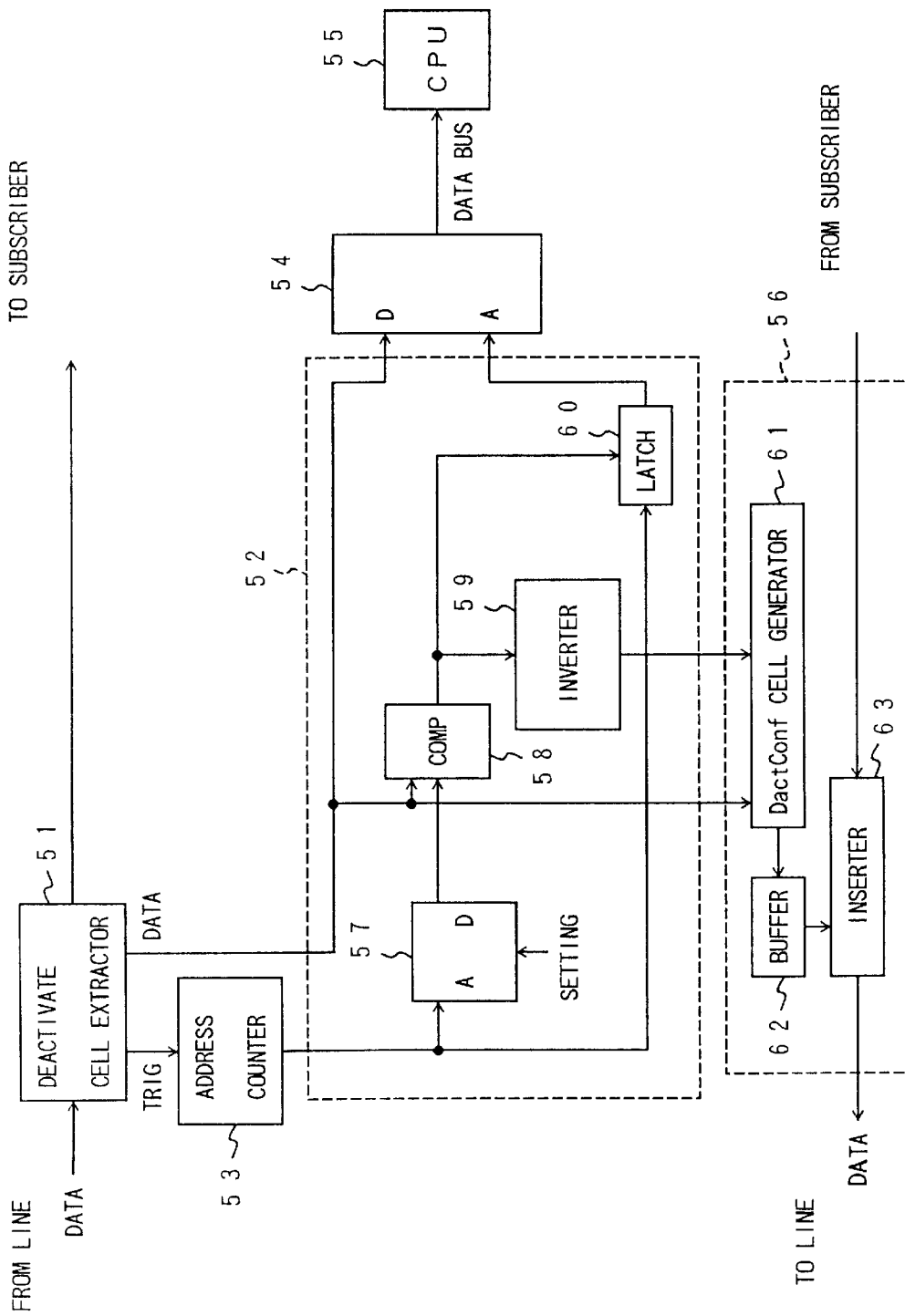
FIG. 6 is a block diagram of an ATM device according to a third embodiment of the present invention.

FIG. 6 is a block diagram of an ATM device according to a third embodiment of the present invention. The ATM device includes a deactivate cell extractor 51, a performance monitor internal state management unit 52, an address counter 53, an ACT/DACT cell information notification register 54, a CPU 55 and a deactivate confirmed cell sending unit 56. The performance monitor internal state management unit 52 includes a performance monitor internal state information memory 57, a comparator 58, an inverter 59 and a latch circuit 60. The deactivate confirmed cell sending unit 56 includes a deactivate confirmed cell generator 61, a buffer 62 and a deactivate confirmed cell inserter 63.

The deactivate cell extractor 51 extracts the deactivate cell from the signal received via the line, and supplies a trigger signal to the address counter 53, and supplies the management unit 52 with the cell information of the extracted deactivate cell. The address counter 53 generates the address of the memory 57 in response to the trigger signal from the extractor 51.

The internal state information of the performance monitor specified by the address supplied from the address counter 53 is read from the memory 57 and is supplied to the comparator 58. Then, the comparator 58 compares the internal state information with the cell information of the extracted deactivate cell. In a case where the internal state information read from the memory 57 shows the VP/VC channel for which the performance monitor process is in progress or is now on request, if the cell information does not coincide with the above internal state information, it is recognized that the extracted deactivate cell is directed to a channel for which the performance monitor process is already deactivated or a channel which is not subjected to the performance monitor process. Thus, the corresponding output signal of the comparator 58 passes through the inverter 59, and is applied to the deactivate confirmed cell generator 61, which generates the deactivate confirmed cell from the extracted deactivate cell supplied from the extractor 51. The deactivate confirmed cell is sent to the line via the buffer 62 and the deactivate confirmed cell inserter 63.

If the cell information of the extracted deactivate cell coincides with the internal state information concerning the performance monitor, the cell information of the extracted deactivate cell is written into the register 54 with the address generated by the address counter 53 obtained via the latch circuit 60.

In the prior art shown in FIG. 1, all the deactivate cells are sent to and processed by the CPU 303, which thus has a large load. According to the structure shown in FIG. 6, the deactivate cells which do not coincide with the internal state information of the performance monitor stored in the memory 57 are not sent to the CPU 54. Thus, the CPU 55 has a reduced load and operates efficiently.

Figure 7:
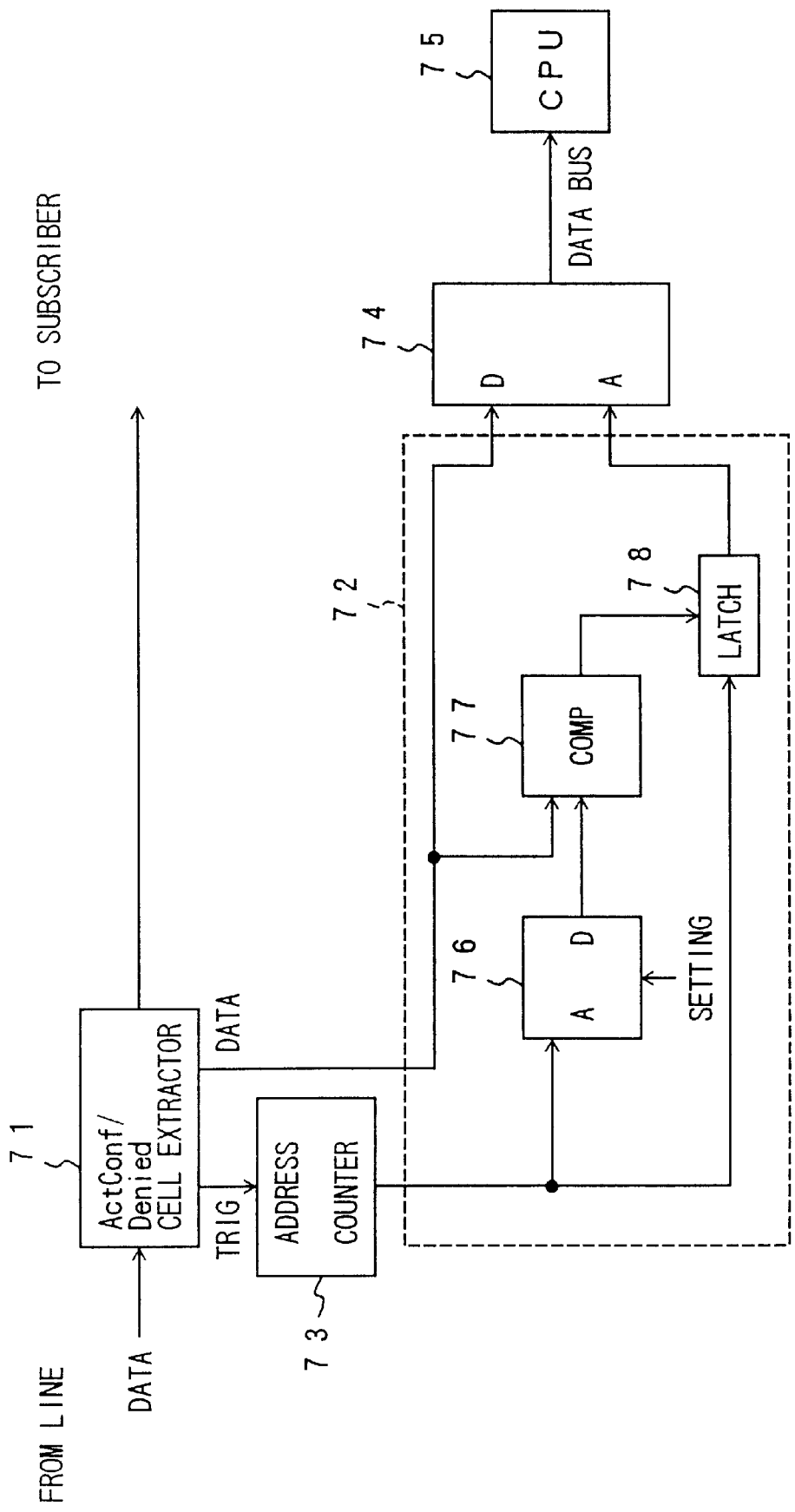
FIG. 7 is a block diagram of an ATM device according to a fourth embodiment of the present invention.

FIG. 7 is a block diagram of an ATM device according to a fourth embodiment of the present invention. The ATM device shown in FIG. 7 includes an activate confirmed cell/deactivate request denied cell extractor 71, a performance monitor internal state management unit 72, an address counter 73, an ACT/DACT cell information notification register 74 and a CPU 75. The performance monitor internal state management unit 72 includes a performance monitor internal state information memory 76, a comparator 77 and a latch circuit 78.

The extractor 71 extracts the deactivate confirmed cell and the deactivate request denied cell from the signal transferred over the line. Then, the extractor 71 supplies a trigger signal to the memory 76 and the cell information of the extracted cell to the management unit 72. The address counter 73 generates an address of the memory 76. The comparator 77 compares the cell information of the extracted cell with the internal state information concerning the performance monitor read from the memory 76. The internal state information stored in the memory 76 includes VP/VC channel information of the activate request issued by the own device. If the internal state information read from the memory 76 does not coincide with the cell information of the extracted cell, it is recognized that the extracted cell is a defective cell which may be erroneously inserted or may have a bit error. In this case, the comparator 77 disables the latch circuit 78 so that the cell information from the extractor 71 is prevented from being stored in the register 74. If the internal state information read from the memory 76 coincides with the cell information of the extracted cell, the address generated by the address counter 73 is applied to the register via the latch circuit 78, so that the cell information of the extracted cell is written into the register 74.

According to the structure shown in FIG. 7, the defective cells are not supplied to the CPU 75. Hence, it is possible to reduce the amount of data and the number of VP/VC channels to be processed by the CPU 75. Hence, the CPU 75 thus a reduced load and operates efficiently.

Figure 8:
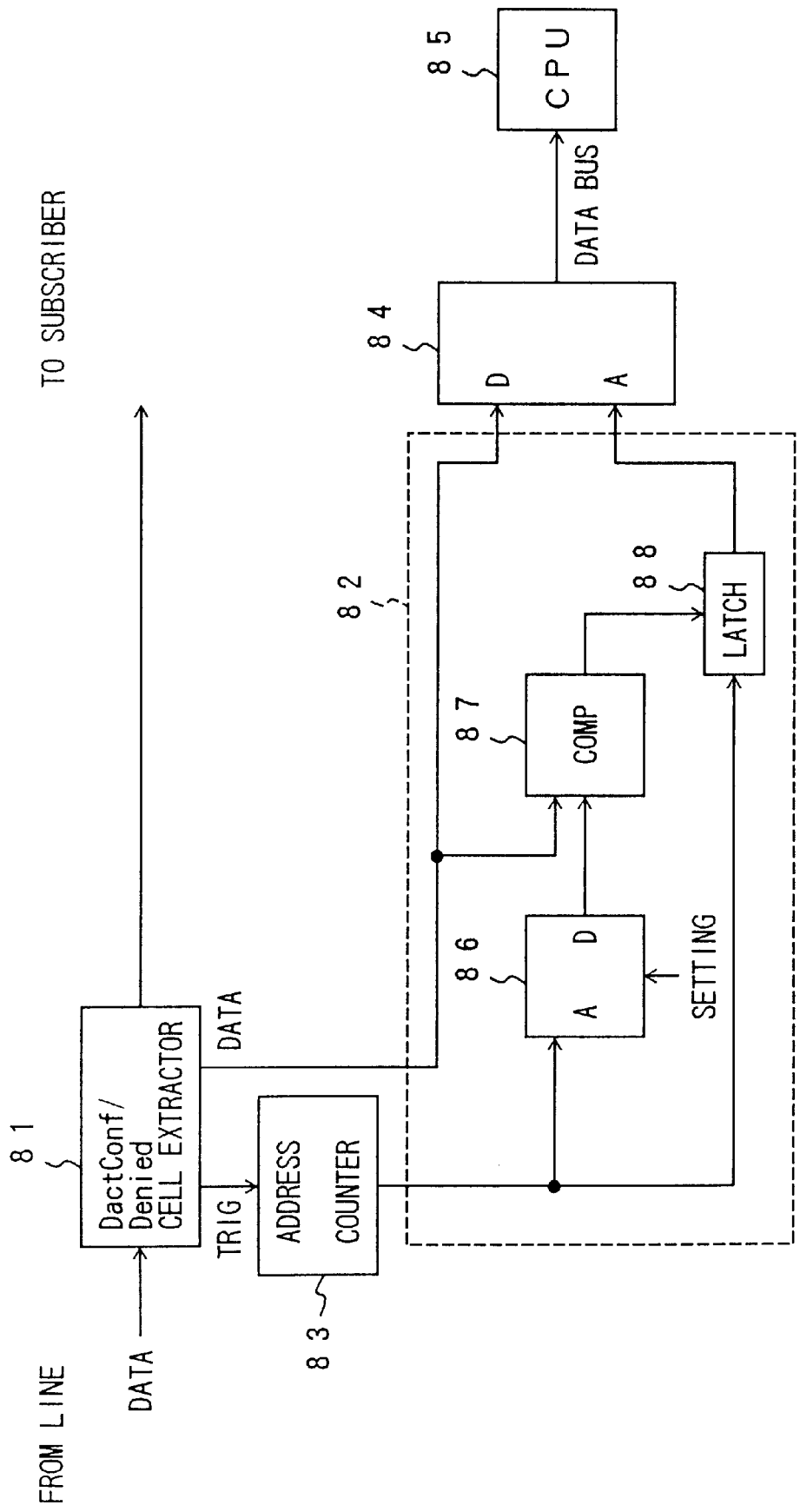
FIG. 8 is a block diagram of an ATM device according to a fifth embodiment of the present invention.

FIG. 8 is a block diagram of an ATM device according to a fifth embodiment of the present invention. The ATM device shown in FIG. 8 includes a deactivate confirmed cell/deactivate request denied cell extractor 81, a performance monitor internal state management unit 82, an address counter 83, an ACT/DACT cell information notification register 84, and a CPU 85. The performance monitor internal state management unit 82 includes a performance monitor internal state information memory 86, a comparator 87 and a latch circuit 88.

The extractor 81 extracts the deactivate confirmed cell and the deactivate request denied cell from the signal transferred over the line. Then, the extractor 81 supplies a trigger signal to the memory 86 and the cell information of the extracted cell to the management unit 82. The address counter 83 generates an address of the memory 86. The comparator 87 compares the cell information of the extracted cell with the internal state information concerning the performance monitor read from the memory 86. The internal state information stored in the memory 86 includes VP/VC channel information of the deactivate request issued by the own device. If the internal state information read from the memory 86 does not coincide with the cell information of the extracted cell, it is recognized that the extracted cell is a defective cell which may be erroneously inserted or may have a bit error. In this case, the comparator 87 disables the latch circuit 88 so that the cell information from the extractor 81 is prevented from being stored in the register 84. If the internal state information read from the memory 86 coincides with the cell information of the extracted cell, the address generated by the address counter 83 is applied to the register via the latch circuit 88, so that the cell information of the extracted cell is written into the register 84.

According to the structure shown in FIG. 8, the defective cells are not supplied to the CPU 85. Hence, it is possible to reduce the amount of data and the number of VP/VC channels to be processed by the CPU 85. Hence, the CPU 85 thus a reduced load and operates efficiently.

Figure 9:
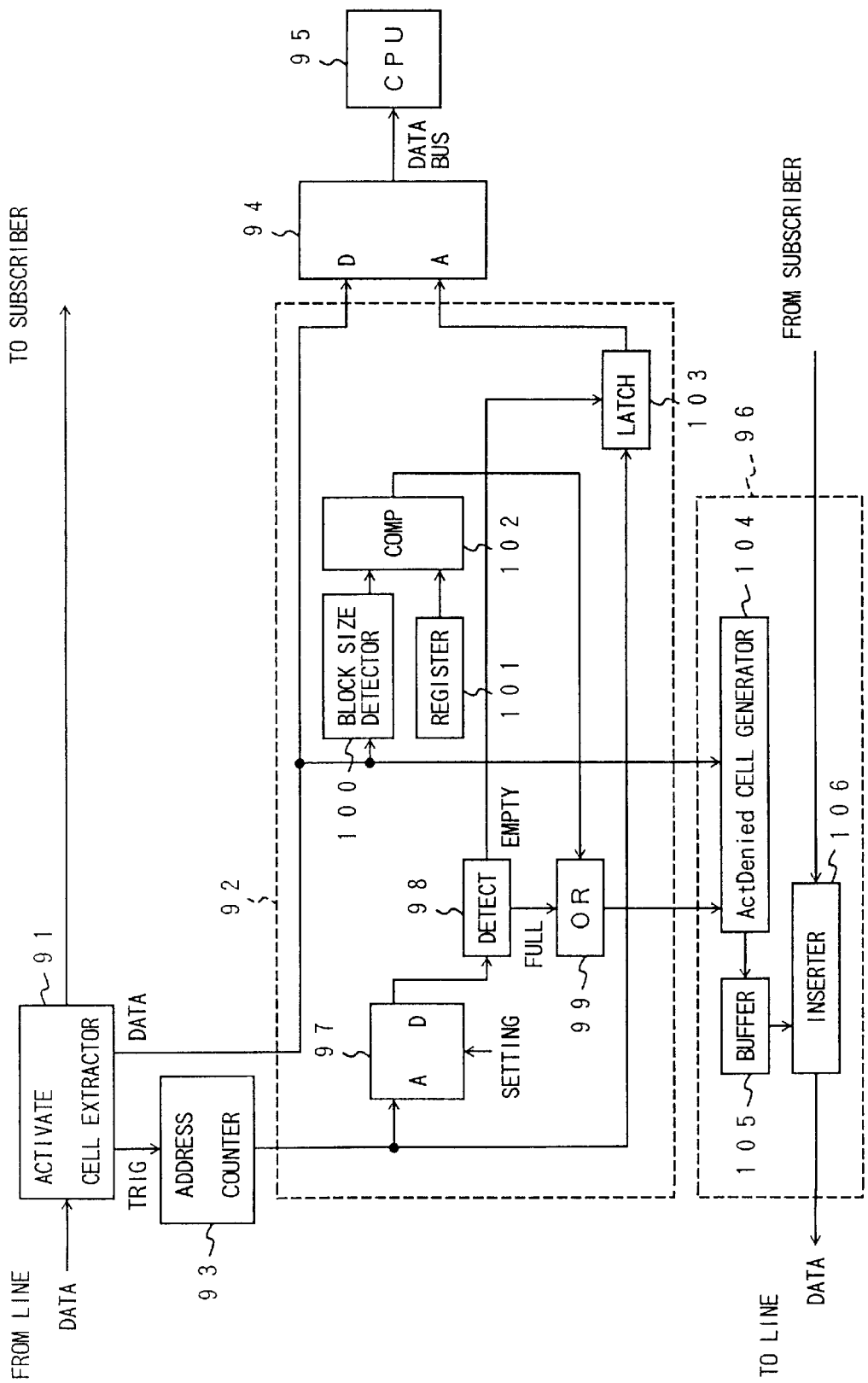
FIG. 9 is a block diagram of an ATM device according to a sixth embodiment of the present invention.

FIG. 9 is a block diagram of an ATM device according to a sixth embodiment of the present invention. The ATM device shown in FIG. 9 includes an activate cell extractor 91, an address counter 93, an ACT/DACT cell information notification register 94, a CPU 95 and an activate request defined cell sending unit 96. The management unit 92 includes a performance monitor internal state memory 97, a memory state detector 98, an OR gate 99, a block size detector 100, a register 101, a comparator 102 and a latch circuit 103. The activate request denied cell sending unit 96 includes an activate request denied cell generator 104, a buffer 105 and an activate cell request denied cell inserter 106.

The ATM device shown in FIG. 9 can be configured by adding the block size detector 100 and the register 101 to the configuration shown in FIG. 4. In this regard, the ATM device shown FIG. 9 corresponds to a modification of the ATM device shown in FIG. 4.

The activate cell extractor 91 extracts the activate cell from the signal transferred over the line. Then, the activate cell extractor 91 supplies a trigger signal to the address counter 93, and supplies cell information of the extracted cell to the management unit 92. In response to the trigger signal, the address counter 93 generates an address of the memory 97. The internal state information concerning the performance monitor specified by the address is read from the memory 97 and is supplied to the memory state detector 98, which operates in the same manner as the memory state detector 18 shown in FIG. 4.

The block size detector 100 detects the block size of the extracted cell by referring to the cell information thereof. The register 101 stores information concerning block sizes that can be processed by the CPU 95. The comparator 102 compares the detected block size with the contents of the register 101. If it is recognized that the block size of the extracted cell can be handled by the CPU 95. In this case, the cell information of the extracted cell is allowed to the supplied to the CPU 95 via the register 94. If it is recognized that the block size of the extracted cell cannot be handled by the CPU 95, the comparator 102 supplies the corresponding signal to the OR gate 99, which then outputs it to the activate request denied cell sending unit 96. Hence, the activate cells having the block sizes which are inconsistent with the block sizes that can be handled by the CPU 95 are rejected.

In the prior art shown in FIG. 1, all the activated cells are supplied to the CPU 303, which analyze all the supplied cells irrespective of whether the supplied cells have block sizes that can be processed by the CPU 303. In contrast, the ATM cell shown in FIG. 9 rejects the activate cells having block sizes which are inconsistent with the block sizes that can be processed by the CPU 95. Hence, it is possible to reduce the amount of data and the number of VP/VC channels to be processed by the CPU 95. Hence, the CPU 95 can operate efficiently with a reduced load.

Figure 10:
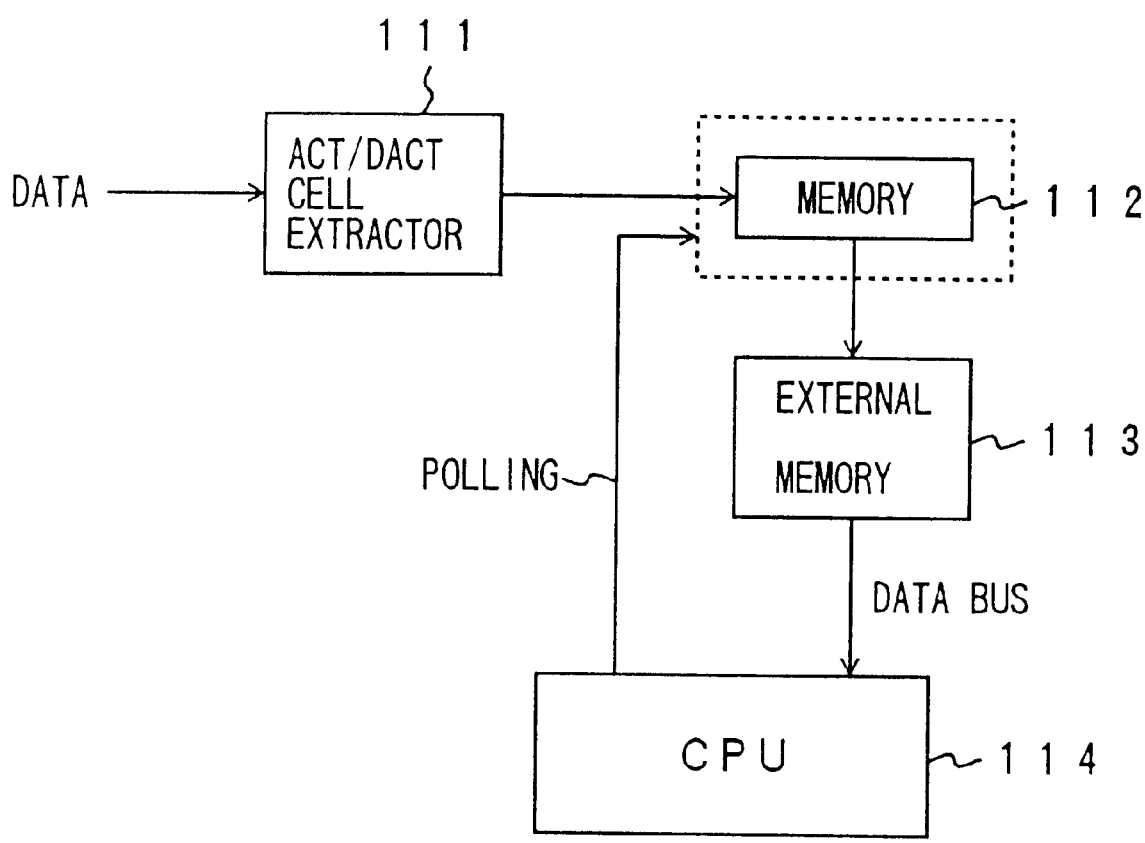
FIG. 10 is a block diagram of a structure which notifies a CPU of cell information of an extracted cell.

FIG. 10 is a block diagram of a hardware structure which supplies an extracted cell to a CPU, the above hardware structure being applied to any of the aforementioned embodiments of the present invention. An ACT/DACT cell extractor 111 extracts the activation cell and the deactivation cell from the signal transferred over the line. The extracted cell is then stored in a hardware formation in a memory 112 of the ACT/DACT cell information notification register used in each of the aforementioned embodiments of the present invention. Then, the extracted cell is read from the memory 112 and an external memory 113. A CPU 114 to which the external memory 113 is connected via a bus periodically sends a polling signal to the memory 112 in order to periodically determine whether any new cell is stored in the memory 112.

If a new cell stored in the memory 112 is confirmed, the CPU 113 reads the new cell from the external memory 113 and executes the necessary process which is any of the start and termination of the performance monitor process and generation of a response to a request issued by another device. The CPU 113 can access the memory 112 with a comparatively long period in order to determine whether there is any new cell in the memory 112. Hence, it is possible to reduce the time necessary to check the presence/absence of new cells and thus reduce the load of the CPU.

Figure 11:
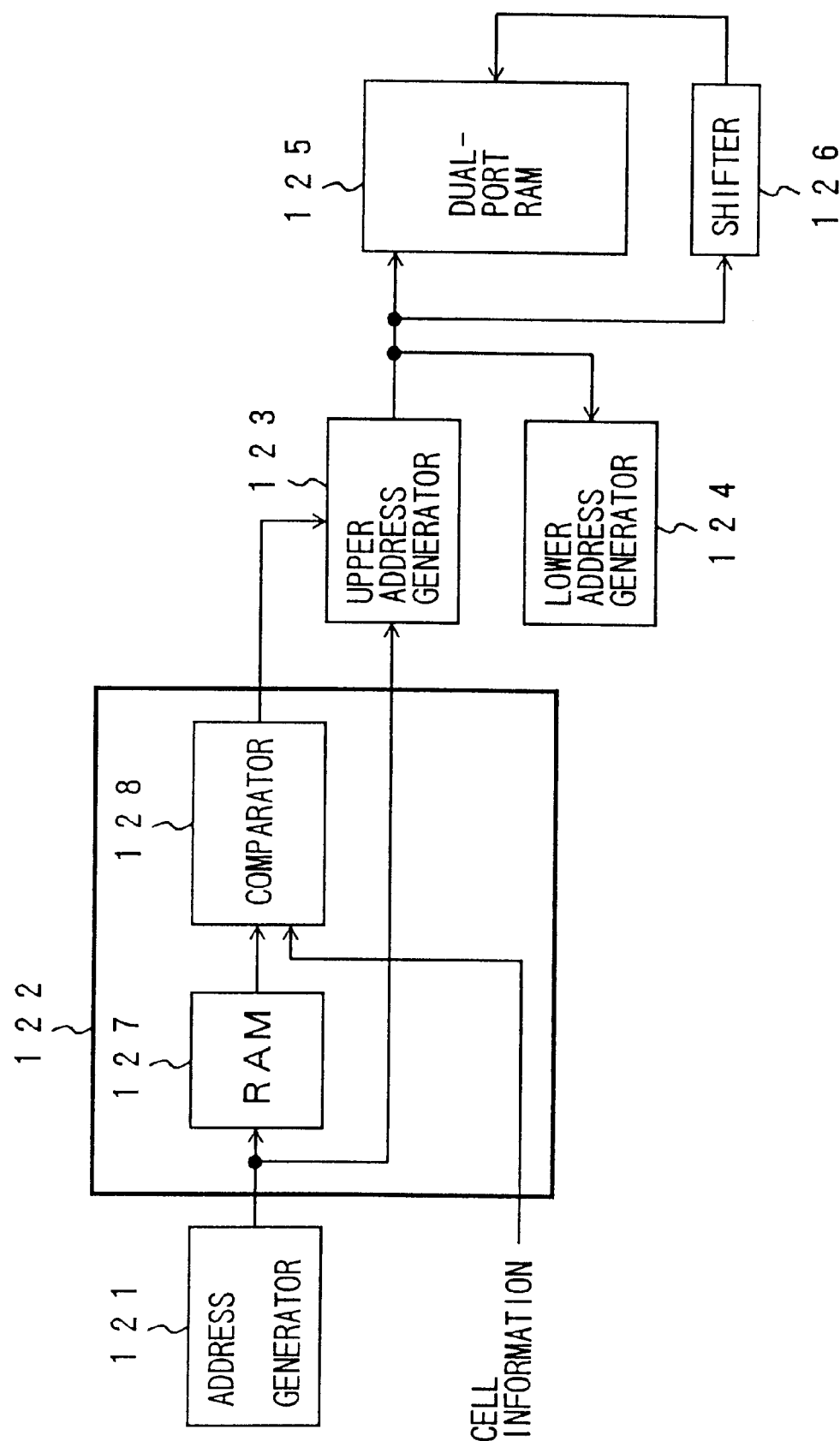
FIG. 11 is a block diagram of a hardware structure applicable to the embodiments of the present invention.

FIG. 11 is a block diagram of a hardware structure of a notification means that can be employed in any of the aforementioned embodiments of the present invention. More particularly, the notification means shown in FIG. 11 corresponds to the ACT/DACT cell information notification register shown in FIGS. 3 to 9, and the memory 112 and the external memory 113 shown in FIG. 10.

A performance monitor internal state management unit 122 includes a RAM 127 and a comparator 128. The RAM stores given information used to determine whether each extracted activation or deactivation cell should be supplied to the CPU. The comparator 128 performs the above determination process.

An address counter 121 corresponds to the address counter used in each of the embodiments of the present invention. The address counter 121 generates an address of the RAM 127 when the valid cell is extracted. Further, the structure shown in FIG. 11 includes an upper address generator 123, a lower address generator 124, a dual-port RAM 125 and a shifter 126. The upper address generator 123 recites the address generated by the address counter 121 as an upper address of the dual-port RAM 125 when it is determined that the extracted cell should be supplied to the CPU. The lower address generator generates a lower address of the dual-port RAM 125, the lower address being related to items of the cell information to be supplied to the CPU.

With the structure shown in FIG. 11, part of the address of the dual-port RAM 125 is common to the address generated by the address counter 121, so that the hardware can be implemented efficiently.

Figure 12:
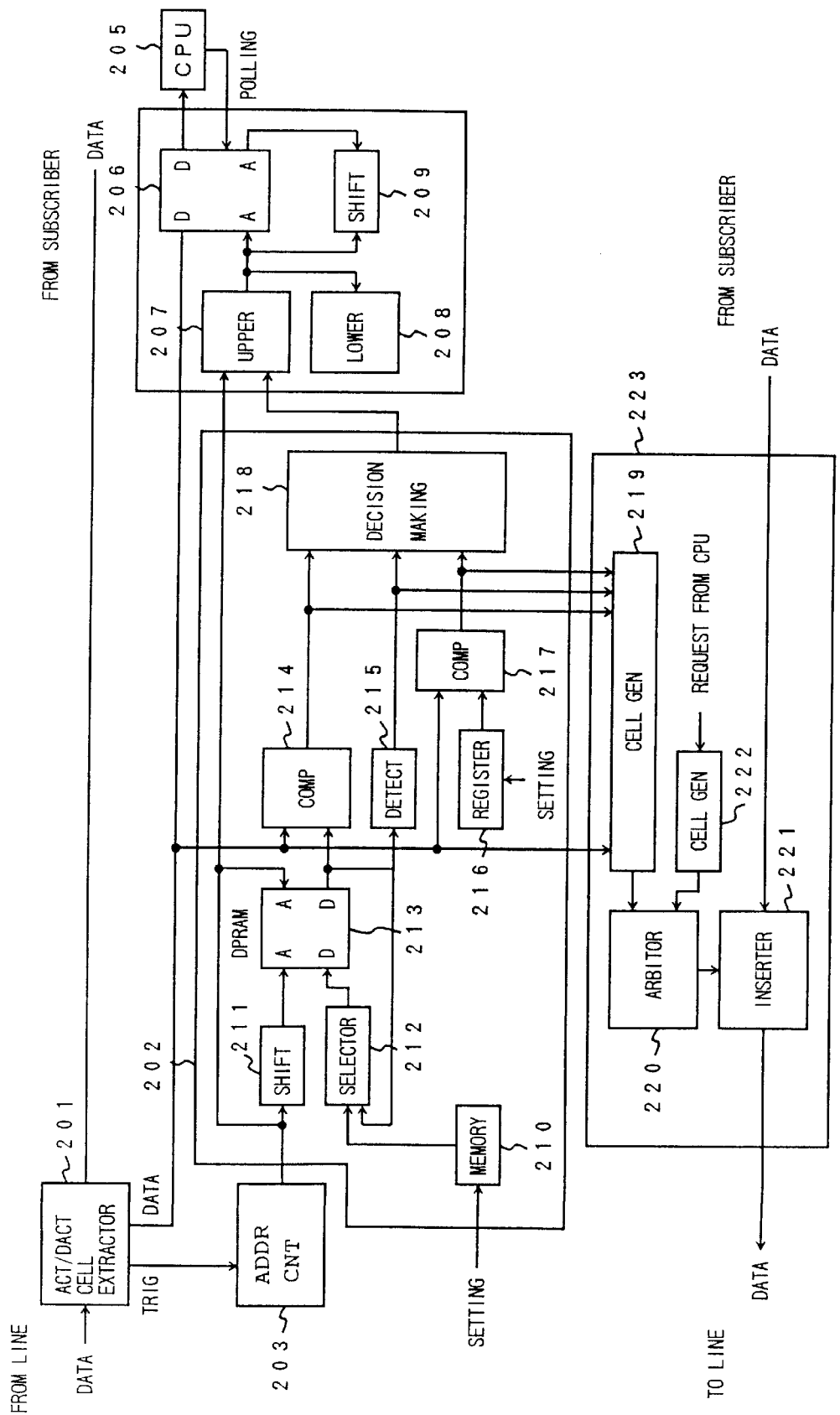
FIG. 12 is a block diagram of an ATM device according to a seventh embodiment of the present invention.

FIG. 12 is a block diagram of an ATM device according to a seventh embodiment of the present invention. The ATM device shown in FIG. 12 includes all the functions of the aforementioned first through sixth embodiments of the present invention. An activation cell/deactivation cell extractor 201 corresponds to the cell extractors shown in FIGS. 4 through 9. A performance monitor internal state management unit 202 corresponds to those shown in FIGS. 4 through 9. An address counter 203 corresponds to those shown in FIGS. 4 through 9. A notification unit 204 corresponds to those shown in FIGS. 10 and 11. A CPU 205 corresponds to those shown in FIGS. 4 through 9. A cell sending unit 206 corresponds to those shown in FIGS. 4, 5, 6 and 9.

The performance monitor internal state management unit 202 includes a performance monitor internal state memory 210, a shifter 211, a selector 212, a dual-port RAM 213, a comparator 214, a memory state detector 215, a block size register 216, a comparator 217, and a decision making unit 218. The memory 210 corresponds to those shown in FIGS. 4 through 9. The comparator 214 corresponds to those shown in FIGS. 4 through 8. The memory state detector 215 corresponds to those shown in FIGS. 3 and 9. The register 21 6 corresponds to th at shown in FIG. 9. The comparator 217 corresponds to that shown in FIG. 9. The decision making unit 218 receives the output signals of the comparators 214 and 217 and the output signal of the memory state detector 215 and makes the aforementioned decision as to whether the received cell should be supplied to the CPU 206.

The notification unit 204 includes an upper address generator 207 corresponding to that shown in FIG. 11, a lower address generator 208 corresponding to that shown in FIG. 11, a dual-port RAM 206 corresponding to the memory 112 and the external memory 113 shown in FIG. 10 and the dual-port RAM 125 shown in FIG. 11, and a shifter 209 corresponding to that shown in FIG. 11. The cell recognized being valid is stored in the dual-port RAM 206 in accordance with the upper and lower addresses respectively supplied from the generators 207 and 208. The cell stored in the dual-port RAM 206 is then read therefrom in response to the polling signal from the CPU 205.

The cell sending unit 223 includes a cell generator corresponding to those shown in FIGS. 4 to 6 and 9, a cell insertion arbitrator 220 corresponding the buffers shown in FIGS. 4 to 6 and 9, and an activation/deactivation cell inserter 221 corresponding to the cell inserters shown in FIGS. 4–6 and 9. The cell sending unit 223 can send the line the active request denied cell, deactivate request denied cell and the deactivate confirmed cell.

The ATM device shown in FIG. 12 has all the functions provided by the aforementioned first to sixth embodiments of the present invention and all the effects thereof.

The present invention is not limited to the specifically disclosed embodiments, and variations and modifications may be made without departing from the scope of the present invention.

What is claimed is:

1. An ATM device comprising:

an extractor which extracts a cell related to a performance monitor process for an ATM layer;

a processing unit executing the performance monitor process;

a memory which stores information concerning the performance monitor process; and a decision making unit which compares the information stored in the memory with cell information of the cell extracted by the extractor and which makes a decision as to whether the cell extracted by the extractor should be supplied to the processing unit.

2. The ATM device as claimed in claim 1, wherein:

the memory has memory areas equal in number of channels that can be processed by the processing unit; and the memory areas respectively store cells extracted by the extractor.

3. The ATM device as claimed in claim 1, wherein:

the memory has memory areas equal in number of channels that can be processed by the processing unit;

the memory areas respectively store cells extracted by the extractor;

a memory state detector which determines whether there is any idle memory area in the memory; and the decision making unit determines that the cell extracted by the extractor should not be supplied to the processing unit when the cell extracted by the extractor requests initiation of the performance monitor process and the memory state detector determines that there is no idle memory area in the memory.

4. The ATM device as claimed in claim 3, further comprising a cell sending unit which sends a denied cell back to a network to which the ATM device is connected when it is determined that the cell extracted by the extractor should not be sent to the processing unit.

5. The ATM device as claimed in claim 1, wherein:

the memory stores information indicating channels which are now subjected to the performance monitor process; and the cell extracted by the extractor is not supplied to the processing unit when the decision making unit determines that cell information of the extracted cell coincides with the information stored in the memory.

6. The ATM device as claimed in claim 5, further comprising a cell sending unit which sends a denied cell back to a network to which the ATM device is connected when the decision making unit determines that cell information of the extracted cell coincides with the information stored in the memory.

7. The ATM device as claimed in claim 1, wherein:

the memory stores information indicating a channel which is now subjected to the performance monitor process in response to a request issued by the ATM device and information indicating that a request to terminate the performance monitor process which is initiated in response to a request issued by the ATM device is issued by another ATM device should be neglected; and the cell extracted by the extractor is not supplied to the processing unit when the decision making unit determines that cell information of the extracted cell coincides with the information stored in the memory.

8. The ATM device as claimed in claim 7, further comprising a cell sending unit which sends a denied cell back to a network to which the ATM device is connected when the decision making unit determines that cell information of the extracted cell coincides with the information stored in the memory.

9. The ATM device as claimed in claim 1, wherein:

the memory stores information indicating a channel which is now subjected to the performance monitor process in response to a request issued by the ATM device and information indicating a channel which is now on request for the performance monitor process; and the cell extracted by the extractor is not supplied to the processing unit when the decision making unit determines that cell information of the extracted cell coincides with the information stored in the memory.

10. The ATM device as claimed in claim 9, further comprising a cell sending unit which sends a denied cell back to a network to which the ATM device is connected when the decision making unit determines that cell information of the extracted cell coincides with the information stored in the memory.

11. The ATM device as claimed in claim 1, wherein:

the memory stores information indicating a channel which is now on request for initiation of the performance monitor process issued by the ATM device; and the cell extracted by the extractor is not supplied to the processing unit when the cell requests a confirmation of initiation of the performance monitor process or denies the request for initiation of the performance monitor process and the decision making unit determines that cell information of the extracted cell does not coincide with the information stored in the memory.

12. The ATM device as claimed in claim 1, wherein:

the memory stores information indicating a channel which is now on request for termination of the performance monitor process issued by the ATM device; and the cell extracted by the extractor is not supplied to the processing unit when the cell requests a confirmation of termination of the performance monitor process or denies the request for termination of the performance monitor process and the decision making unit determines that cell information of the extracted cell does not coincide with the information stored in the memory.

13. The ATM device as claimed in claim 1, wherein:

the memory stores information indicating a block size that can be processed by the processing unit; and the cell extracted by the extractor is not supplied to the processing unit when the decision making unit determines that the cell has a block size which is inconsistent with the block size stored in the memory.

14. The ATM device as claimed in claim 1, comprising another memory which temporarily stores the cell extracted by the extractor and which is determined that the cell should be supplied to the processing unit, the processing unit periodically accessing said another memory and determines whether there is any cell to be processed.

15. The ATM device as claimed in claim 14, wherein a part of an address of said another memory is common to an address of said memory which stores the information concerning the performance monitor process.

* * * * *